United States Patent [19]
Benjamin et al.

[11] 3,788,658
[45] Jan. 29, 1974

[54] INSTANT CHANGE TOOL HOLDER

[75] Inventors: Milton L. Benjamin; David D. Walker; Wilbur N. Miles, all of Chagrin Falls, Ohio

[73] Assignee: Erickson Tool Company, Solon, Ohio

[22] Filed: Aug. 14, 1972

[21] Appl. No.: 280,650

[52] U.S. Cl. .................... 279/75, 279/1 B, 279/1 E
[51] Int. Cl. ............................................ B23b 31/06
[58] Field of Search.... 279/1 B, 75, 1 E, 29, 30, 76, 279/81, 82, 89

[56] References Cited

UNITED STATES PATENTS

| | | | |
|---|---|---|---|
| 3,658,351 | 4/1972 | Benjamin et al. | 279/1 B |
| 3,583,715 | 6/1971 | Jahri | 279/89 |

*Primary Examiner*—Andrew R. Juhasz
*Assistant Examiner*—Z. R. Bilinsky
*Attorney, Agent, or Firm*—Donnelly, Maky, Renner & Otto

[57] ABSTRACT

A tool holder characterized in that the drive housing socket and the tool adaptor shank driven thereby have a quick release connection with each other, and have sleeves rotatable thereon to facilitate the connection and disconnection of the adaptor and housing without stopping rotation of the machine tool spindle in which the drive housing is adapted to be mounted. The housing sleeve is axially movable on the housing between locking and unlocking positions and the housing has a latch mechanism which holds the housing sleeve in unlocking position, the latch mechanism being operative during axial insertion of the adaptor shank into the housing socket to initiate rotation of the shank for facilitating the making of an axially interfitted driving connection between the housing and shank and to automatically release the housing sleeve for movement to adaptor locking position.

7 Claims, 3 Drawing Figures

PATENTED JAN 29 1974 3,788,658

INSTANT CHANGE TOOL HOLDER

BACKGROUND OF THE INVENTION

It is known as disclosed in the Milton L. Benjamin et al U.S. Pat. No. 3,658,351, granted April 25, 1972, to provide an instant change tool holder of the character indicated wherein the drive connection between the housing and shank comprises a drive pin extending diametrically across the socket engaged in a slot extending diametrically across the end of the shank, and, hence, when the shank is axially inserted into the housing socket it is suddenly rotated upon alignment of the drive pin with the slot in 180° intervals, and after the housing and shank are in driving engagement, the continual axial insertion of the shank effects actuation of the latch mechanism to release the housing sleeve to locking position thereby to lock the shank against axial withdrawal from the housing socket.

SUMMARY OF THE INVENTION

Contrary to the foregoing in the tool holder herein, the shank during insertion into the housing socket initially engages a latch member with sliding friction to avoid sudden shock load in the starting of the rotation of the shank and to facilitate registry of driving keys and grooves in small angular intervals.

Other objects and advantages of the present invention will appear hereinafter.

DETAILED DESCRIPTION OF THE INVENTION

Figure 1:
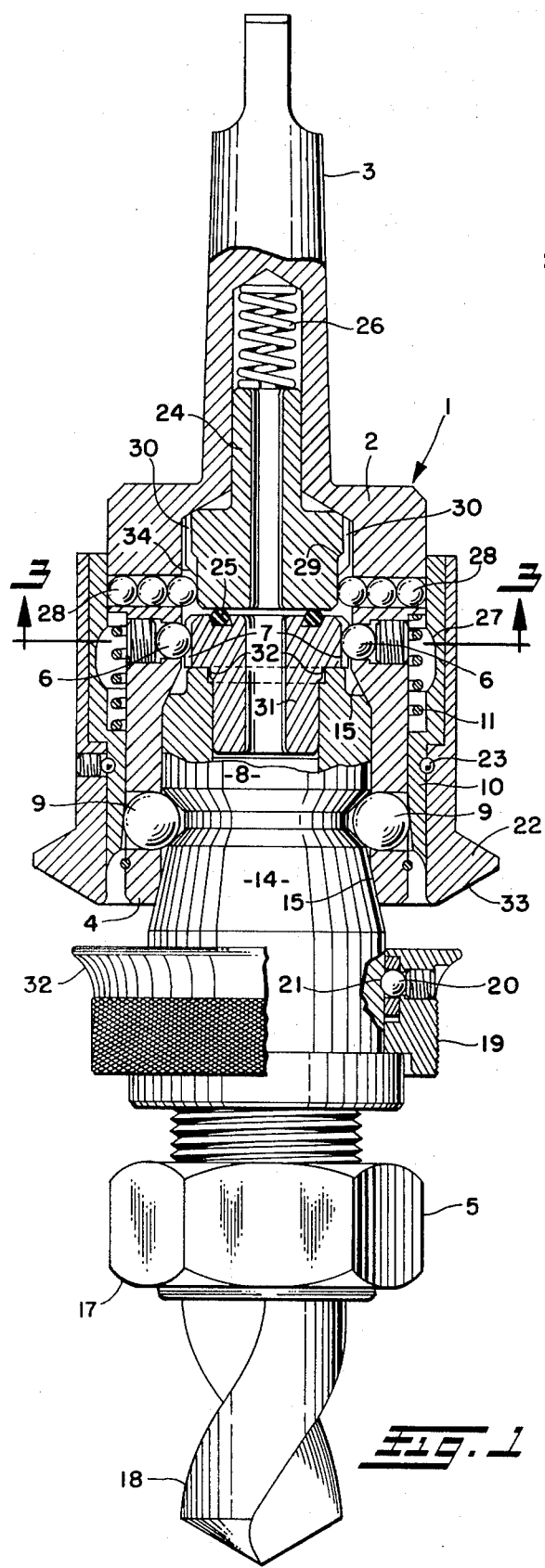
FIG. 1 is a central vertical cross section view of a preferred form of tool holder showing the drive housing and tool adaptor in locked driving engagement.

The tool holder 1 herein comprises a drive housing 2 having a shank 3 by which it is adapted to be held in a machine tool spindle or the like (not shown). The end of the housing 2 opposite the shank 3 has a tubular socket 4 to receive the tool carrying adaptor 5, a drive connection between the housing 2 and the adaptor 5 being formed by the six equally spaced ball keys 6 which project radially inwardly of socket 4 into engagement with six of the 12 equally spaced keyways 7 around the upper end of the shank 8 of the adaptor 5. Adjacent the mouth of the socket 4 the housing 2 has a plurality of holes radially through the wall thereof in which are disposed radially movable balls 9 which are of diameter greater than the wall thickness of the socket 4.

The cam or lock sleeve 10 actuated by the spring 11 is operative to cam or wedge the balls 9 radially inwardly as shown in FIG. 1 into locking position to engage the upper flank of the peripheral groove 12 in the shank 8, thus to urge the axially spaced apart coaxial tapered faces 14 of the adaptor 5 into engagement with complemental coaxial tapered surfaces 15 in the socket 4, thus to securely mount the adaptor 5 in accurate coaxial relation to the housing 2 without any axial or radial looseness.

Herein the adaptor 5 is provided with a collet chuck 17 or the like by which the tool 18 is secured in the adaptor 5 and as evident, other means of holding the tool 18 may be employed. Rotatable on the adaptor 5 is a ring or sleeve 19 which is rotatably and axially retained by the ball bearings 20 engaged in raceways 21 in shank 8 and ring 19.

A sleeve 22 is rotatably supported on the housing 2 and on the lock sleeves 10 as by means of a series of balls 23 engaged in matching grooves around the lock sleeve 10, and within the sleeve 22. The sleeve 22 as can now be seen constitutes an actuator for the cam or lock sleeve 10 so that when the housing 2 and adaptor 5 are rotating in locked position, with corresponding rotation of the lock sleeve 10, the sleeve 22 may be grasped by hand and moved upwardly with respect to the housing 2 to an unlocking position whereat the adaptor 5 is released for downward withdrawal from the housing 2.

Within the socket 4 is an ejector 24 which has a plane bottom surface to engage the O-ring 25 retained in a groove in the upper end of the adaptor shank 8 to urge the adaptor 5 out of engagement with the ball keys 6 when the ejector 24 is released for downward movement under the influence of the spring 26 acting thereon.

Figure 2:
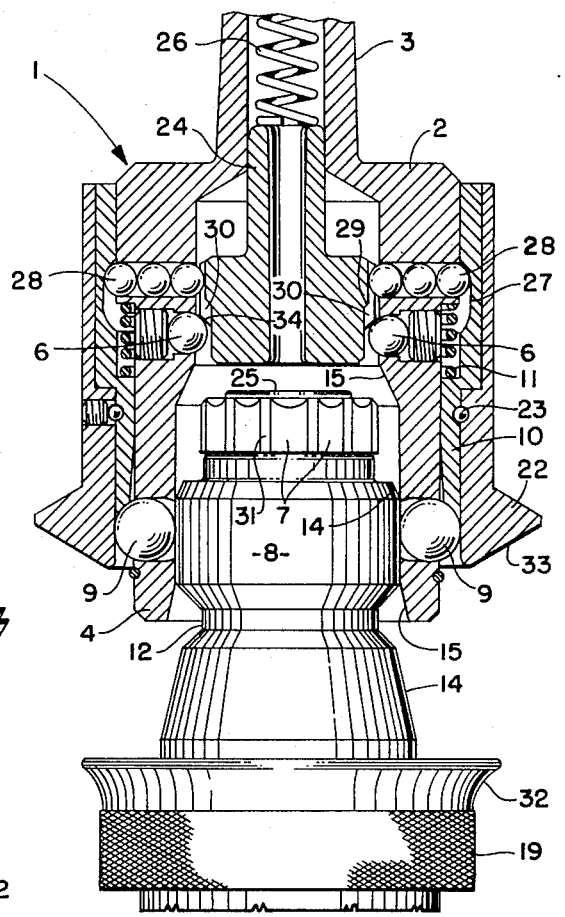
FIG. 2 is fragmentary cross section view showing the drive housing lock actuating sleeve in a latched position ready for release to locking position upon insertion of the tool adaptor shank thereinto.
Figure 3:
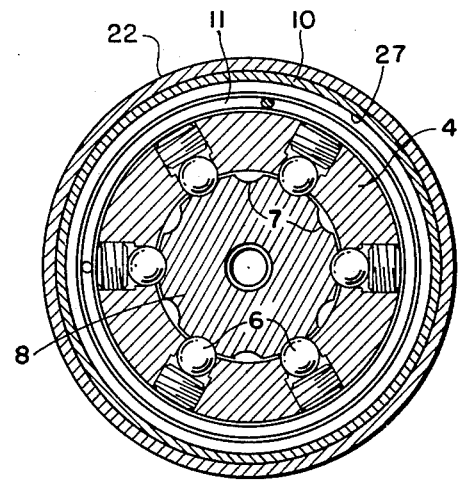
FIG. 3 is a cross section view taken substantially along the line 3—3, FIG. 1.

When it is desired to release the adaptor 5 from the housing 2 while the housing and adaptor 5 are locked together with the adaptor 5 driven by the housing 2, the machine operator may grasp the ring 19 on the adaptor 5 and the actuator sleeve 22 and move the latter upwardly from the FIG. 1 position to the FIG. 2 position. In the upper position of the sleeve 22, the internal groove 27 in lock sleeve 10 is opposite the radial rows of balls 28 which are movable radially in holes in the housing 2 whereby the cam surface 29 on the ejector 24 will move the balls 28 radially outwardly to the FIG. 2 position in which they are held by the bottoms of the grooves 30 of the ejector 24. As the ejector 24 moves down to the FIG. 2 position it moves the adaptor 5 downwardly out of driving engagement with the ball keys 6, the balls 9 having at that time been cammed outwardly by the adaptor groove 12 to the position shown in FIG. 2, thus to free the adaptor 5 for downward removal of the shank 8 thereof from within the housing 2. The housing sleeve 22 and lock sleeve 10 will be held in the upper latched unlocking position shown in FIG. 2 until the adaptor shank 8 is inserted into the socket 4. As the adaptor shank 8 is inserted into the socket 4 the O-ring 25 will first engage the bottom of the ejector 24 to gradually start rotation of the adaptor shank 8 by reason of slight slippage as the O-ring 25 initially contacts the ejector 24 to move the latter upwardly. As the shank 8 and ejector 24 are moved upwardly, the keyways 7 register with the ball keys 6 within 30° rotation of the socket 4 with respect to the shank 8, and the cam surface 29 releases the balls 28 for radial inward movement whereupon the spring 11 will urge the lock sleeve 10 and actuator sleeve 22 downwardly to the FIG. 1 position to cause the balls 9 to be cammed and locked in a radial inward position in engagement with the upper flank of the adaptor groove 12.

It is to be noted that when the balls 9 are cammed radially inwardly by the lock sleeve 10, they will exert a vertical force component on the shank 8 thus to tightly urge the tapered surfaces 14 and 15 into firm engagement to eliminate axial or radial looseness so that there cannot be any wobbling or tilting of the adaptor 5.

For ease of manufacture, the upper end of the adaptor shank 8 comprises a separate drive member 31 which is press-fitted into the shank 8 and which has flats 32 engaged with the opposite sides of a slot in the upper end of said shank 8.

For convenience, the ring or sleeve 19 may have a curved shoulder 32 so that it may be grasped as between the forefinger and thumb of one hand while the tip of the thumb is pressed upwardly against the beveled collar 33 of the sleeve 22 to urge the latter upwardly to its FIG. 2 latched position whereat the adaptor 5 is released and ejected as aforesaid. In inserting the adaptor shank 8 into the socket 4 while the sleeve 22 is in unlocked latched position, it is only necessary to grasp the ring or sleeve 19 of the adaptor 5 between the thumb and forefinger for example, and to move the adaptor 5 upwardly until the shank 8 engages the ejector 24 whereupon continued upward movement of the shank 8 and ejector 24 will permit the spring 11 to urge the lock sleeve 10 and actuator sleeve 22 downwardly thereby camming the balls 28 radially inwardly. At that time the lock sleeve 10 snaps down to its FIG. 1 position to force the balls 9 into firm engagement with the shank groove 12 to firmly seat the shank 8 in the socket 4.

It can be seen that the tool holder 1 herein is of such construction that tool mounting adaptors 5 may be quickly inserted or withdrawn from the housing 2 without stopping rotation of the housing 2. Furthermore, when the adaptor 5 has been released from the housing 2, the housing 2 — adaptor 5 locking and unlocking mechanism remains latched in unlocking position ready for insertion of the next adaptor 5 whereupon when there is proper engagement between the adaptor 5 and the housing 2, the latching mechanism is released to firmly secure the adaptor shank 8 accurately in the holder socket housing 4 with the tapered locating surfaces 14 firmly engaged with corresponding tapered locating surfaces 15 in the socket 4 to secure accurate coaxial alignment between the adaptor 5 and the housing 2 without play. The ejector 24 has a stop shoulder 34 which engages the ball keys 6 to locate the bottom of the ejector 24 for engagement by the O-ring 25 before the keyways 7 are engaged by the balls 6 during upward insertion of the adaptor shank 8.

We, therefore, particularly point out and distinctly claim as our invention:

1. In a tool holder wherein interfitting socket and shank members are axially releasably locked together by a lock sleeve which is axially movable on said socket member from a spring biased locking position whereat it cams a locking element radially inwardly into engagement with a groove on said shank member to an unlocking position whereat it releases said locking element for radial outward movement out of engagement with said groove for axial withdrawal of said shank member from said socket member, the improvement which comprises latch means in said socket member operative to releasably engage said lock sleeve to retain it in unlocking position; axially interfitting drive means between said socket and shank members operative to impart rotation of said socket member to said shank member when said members are locked together; said latch means having spring biased operating means moved against such spring bias by axial insertion of said shank member into said socket member to release said latch means from said lock sleeve for spring biased movement of the latter to said locking position; said operating means and shank member having frictionally engaged surfaces operative during axial insertion of said shank member into said socket member while the latter is rotating to initiate rotation of said shank member prior to interengagement of said drive means.

2. In a tool holder wherein interfitting socket and shank members are axially releasably locked together by a lock sleeve which is axially movable on said socket member from a spring biased locking position whereat it cams a locking element radially inwardly into engagement with a groove on said shank member to an unlocking position whereat it releases said locking element for radial outward movement out of engagement with said groove for axial withdrawal of said shank member from said socket member, the improvement which comprises latch means in said socket member operative to releasably engage said lock sleeve to retain it in unlocking position; axially interfitting drive means between said socket and shank members operative to impart rotation of said socket member to said shank member when said members are locked together; said latch means having operating means moved by axial insertion of said shank member into said socket member to release said latch means from said lock sleeve for spring biased movement of the latter to said locking position; said members having frictionally engaged surfaces operative during axial insertion of shank member into said socket member while the latter is rotating to initiate rotation of said shank member prior to interengagement of said drive means; said drive means comprising a plurality of circumferentially spaced apart radially inwardly projecting balls in said socket member engaged in radially overlapping relation in axial keyways in said shank member when said members are locked together; the number of axial keyways exceeding the number of balls thus to decrease the angle of relative rotation of said members for effecting interengagement of said members in driving relation during axial insertion of said shank member into said socket member.

3. In a tool holder wherein interfitting socket and shank members are axially releasably locked together by a lock sleeve which is axially movable on said socket member from a spring biased locking position whereat it cams a locking element radially inwardly into engagement with a groove on said shank member to an unlocking position whereat it releases said locking element for radial outward movement out of engagement with said groove for axial withdrawal of said shank member from said socket member, the improvement which comprises latch means in said socket member operative to releasably engage said lock sleeve to retain it in unlocking position; axially interfitting drive means between said socket and shank members operative to impact rotation of said socket member to said shank member when said members are locked together; said latch means having operating means moved by axial insertion of said shank member into said socket memeber to release said latch means from said lock sleeve for spring biased movement of the latter to said locking position; said members having frictionally engaged surfaces operative during axial insertion of said shank member into said socket member while the latter is rotating to initiate rotation of said shank member prior to interengagement of said drive means; said operating means being axially slidably keyed to said socket member; said frictionally engaged surfaces including interengageable end portions of said operating means and said shank member; one of said surfaces comprising a ring of rubber-like material disposed in an annular groove in one of said shank member and operating means and projecting axially from said groove for engagement with the end portion of the other of said shank member and operating means whereby, upon initial engagement of said surfaces, some rotary slippage occurs for relative rotation of said socket and shank members for registry of said drive means upon continued axial insertion movement of said shank member into said socket member.

4. The tool holder of claim 1 wherein said latch means has a radially outer portion movable into and out of an internal recess in said lock sleeve, and a radially inner portion to which said operating means is axially slidably keyed; said operating means having a cam surface to urge and retain the radially outer portion of said latch means in said recess thus to retain said lock sleeve in unlocking position until said operating means is moved by axial insertion of said shank member to a position whereat said cam surface releases said latch means for movement of said radially outer portion out of said recess whereby said lock sleeve is released for spring-biased movement to locking position.

5. The tool holder of claim 4 wherein said operating means has an end portion extending within and axially beyond the drive means in said socket member for frictional engagement by the end portion of said shank member during axial insertion of said shank member into said socket member and prior to interengagement of the drive means of said shank member with the drive means of said socket member.

6. The tool holder of claim 5 wherein said drive means comprises a plurality of f radially inwardly projecting balls in said socket member which are engaged in radially overlapping relation in axial keyways on the exterior of the end portion of said shank member when said members are locked together.

7. The tool holder of claim 6 wherein said operating means has a stop shoulder engageable with said radially inwardly projecting balls when said operating means is in a position retaining said radially outer portion of said latch means in said recess.

* * * * *